April 5, 1955

M. WEAVER 2,705,559

SEED SEPARATOR

Filed Feb. 24, 1954

Morris Weaver
INVENTOR.

BY *Clarence A. O'Brien*
*and Harvey B. Jackson*
Attorneys

April 5, 1955

M. WEAVER 2,705,559

SEED SEPARATOR

Filed Feb. 24, 1954

Morris Weaver
INVENTOR.

United States Patent Office 2,705,559
Patented Apr. 5, 1955

2,705,559

SEED SEPARATOR

Morris Weaver, Fredericksburg, Pa.

Application February 24, 1954, Serial No. 412,312

1 Claim. (Cl. 209—139)

This invention relates to improvements in seed separators and relates more particularly to an improvement in my Patent No. 2,099,505, patented November 16, 1937.

A primary object of this invention is to provide an efficient and inexpensive apparatus for separating and cleaning seeds without the use of sieves but by means of air blasts or currents and wherein a vertically adjustable deflective member is utilized to effect the proper air-blasts which will effectively clean and separate seeds of various weights and sizes.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
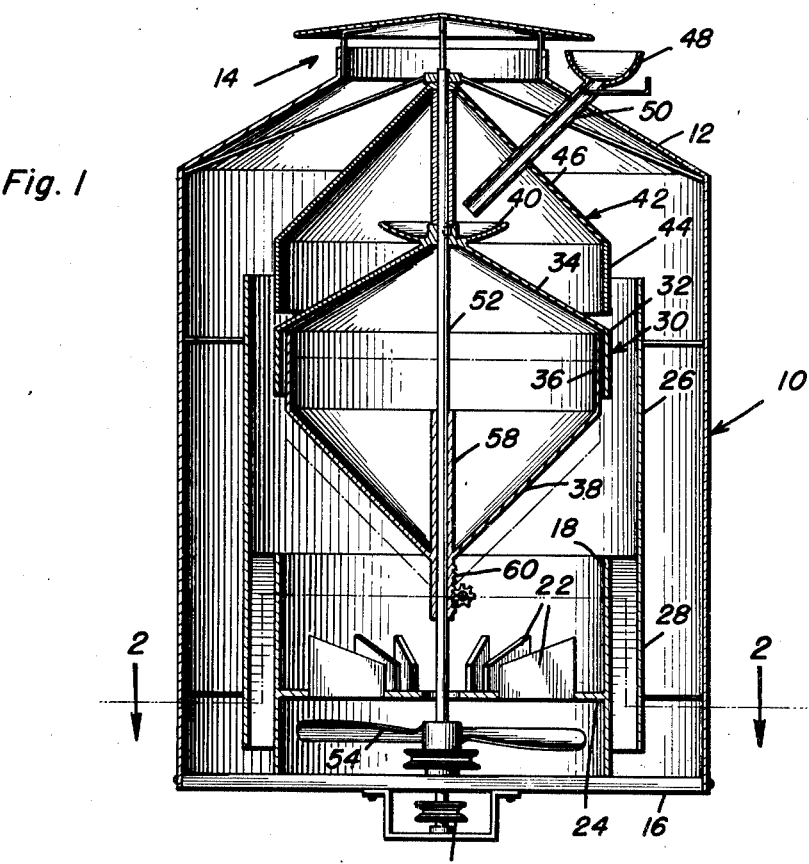
Figure 1 is a vertical section taken through the improved seed separator.
Figure 2:
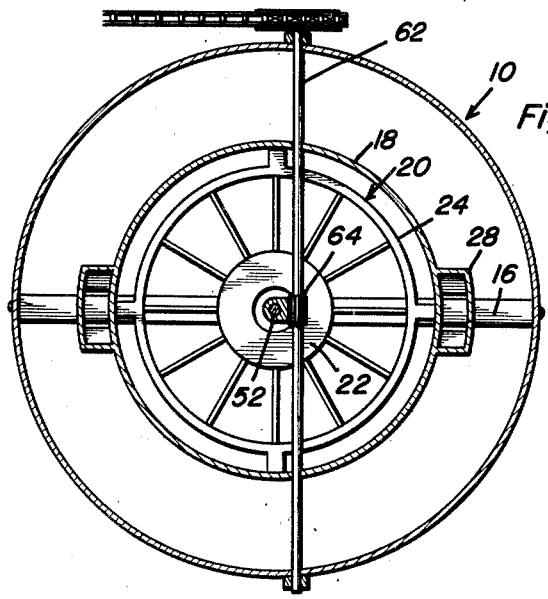
Figure 2 is a horizontal section taken substantially along the plane of section line 2—2 in Figure 1.
Figure 3:
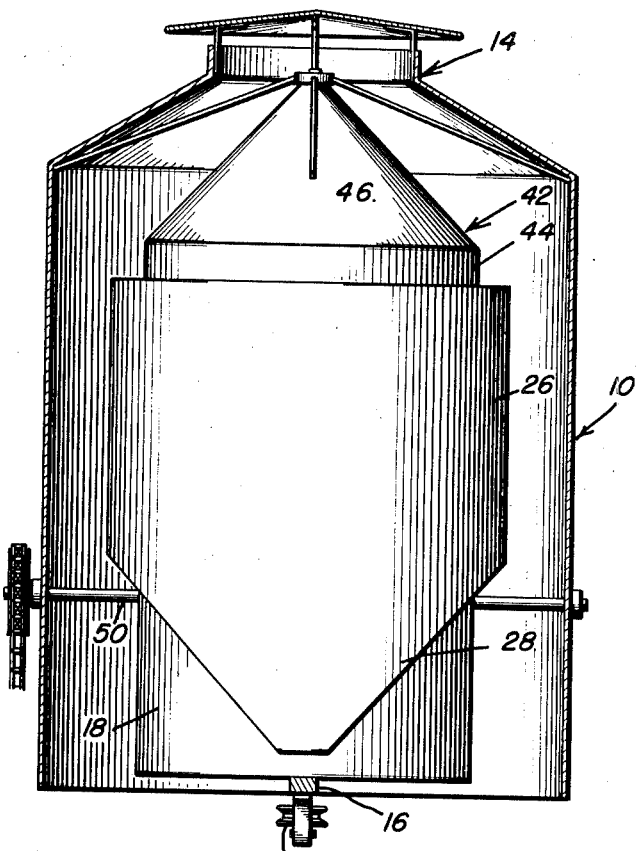
Figure 3 is a transverse vertical section of the assembly shown in Figure 1 but showing portions thereof in elevation.
Figure 4:
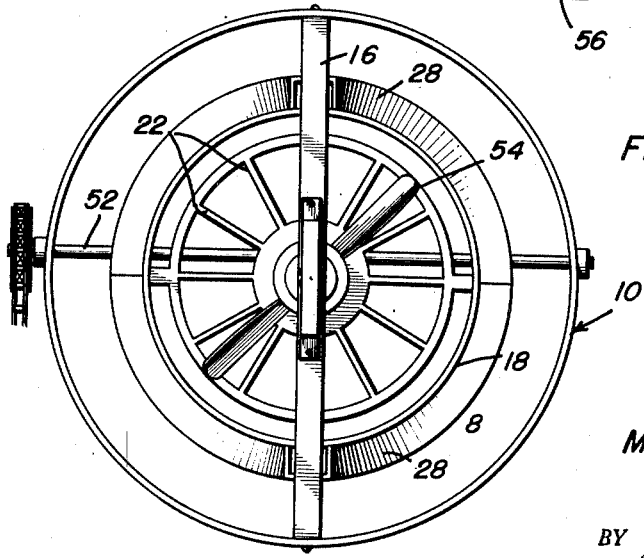
Figure 4 is a bottom plan view of the seed separator assembly.

Referring now more particularly to the drawings, reference numeral 10 indicates generally an outer cylindrical casing which is open at its lower end and which is provided at its upper end with a conical neck portion 12 terminating in the upper flue asembly indicated generally by the reference character 14. At the lower end of the casing there is provided a diametrically extending support bar member 16 upon which a cylindrical air tunnel member 18 is rigidly mounted, the air tunnel being disposed concentrically within the casing 10. The member 18 is provided with an intermedate air vane assembly which comprises a spider assembly 20 having a series of radially spaced air vanes 22 formed therewith, the air vanes extending between the inner and outer annuluses 22 and 24, respectively, of the spider assembly. The entire spider assembly is suitably attached at spaced points to the inner surface of the air tunnel member 18.

A further cylindrical member 26 is disposed concentrically within the casing 10 and its lower edge is at the same elevation as the upper edge of the member 18 and is provided thereat with a pair of diametrically opposed tapered seed discharge chutes 28. Thus, an upstanding cylindrical structure of which the members 18 and 26, respectively, are the lower and upper sections thereof, is formed concentrically and in upstanding relation within the casing 10.

A deflector assembly indicated generally by the reference character 30 is disposed concentrically within the casing 10 substantially within the confines of the upper end of the member 26, and it will be noted that this assembly is of the same diameter as the lower section 18. The assembly consists of an upper member 32 of cylindrical configuration having an upper coned surface 34 and a lower member 36 of cylindrical configuration disposed within and in overlapping relation to the upper member 32, the lower member having a lower conical surface 38 in the manner shown. The upper member 34 is provided with a concave circular seed distributor 40.

A baffle assembly indicated generally by the reference character 42 is provided concentrically within the casing 10 above the deflector assembly 30 and comprises a cylindrical lower end portion 44 disposed just within the upper edge of the upper section 26 and a conical upper end 46 in the manner shown most clearly in Figure 1.

The casing 10 carries a feed pan 48 from which a gravity chute member 50 is directed inwardly of the casing to a point adjacent the seed distributor 40 and any suitable control means may be associated therewith to control the flow of seed from the gravity feed pan 48 to the distributor 40.

A drive shaft 52 is disposed in upstanding relation within the casing 10 and axially therewith and may be journaled therein in any suitable manner. The lower end of the shaft carries a blower fan 54 for directing air upwardly through the air vane blades 22 and the shaft may be driven in any suitable manner such as by the pulley 56. The upper member 32 of the deflector assembly is feathered to the shaft 52 for rotation therewith and the lower member 36 is rotatably and slidably received on the shaft by virtue of its elongated collar portion 58 which extends downwardly from the lower section and is provided thereon with rack teeth 60 in the manner shown. A transverse horizontal shaft 62 extends through the casing and is journaled therein and is provided with a drive pinion 64 engaging with the rack teeth 60 such that by rotation of the shaft 62 the lower member 36 will be moved upwardly or downwardly along the shaft 52 toward and away from the blower fan 54. The engagement between the pinion 64 and the rack teeth 60 prevents rotation of the lower member 36.

By the construction defined, it will be readily apparent that the manner in which seeds deposited in the separator assembly are separated, can be adjusted and varied by manipulating the lower member 36 of the deflector assembly toward or away from the blower fan 54 to vary the air blasts directed upwardly through the separator assembly for separating the larger from the smaller seeds and for cleaning the same and ejecting the chaff and foreign material through the open upper flue assembly 14.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claim.

What is claimed as new is as follows:

A seed separator comprising a cylindrical upstanding casing open at its lower end and having a conical upper neck terminating in an open flue member, a bar extending diametrically across the lower end of said casing, an upstanding cylindrical structure in said casing supported on said bar axially of said casing and terminating short of the neck thereof, said structure comprising a lower open-ended section forming a vertical air tunnel, and a relatively larger concentric upper section forming a separator chamber above the air tunnel open at its upper end, said structure also including a pair of tapered seed discharge chutes extending from the bottom of the upper section upon opposite sides of the lower section, respectively, a cylindrical deflector assembly mounted in said upper section of the same diameter as said lower section and supported above the latter concentrically thereof, said assembly including upper and lower members having oppositely coned surfaces, the lower member extending partially into said lower section to deflect air therefrom obliquely and upwardly against the inner wall of the upper section, and said upper member forming a spreader for deflecting seed deposited thereon against the side wall of the upper section outwardly and downwardly, a concave circular seed distributor mounted on the upper member for ejecting seed deposited therein upwardly and outwardly under the action of centrifugal force, a cylindrical baffle mounted in said casing concentrically thereof above said deflector assembly and having a lower skirt depending into said upper section adjacent the upper end of the deflector to form a narrow discharge opening around the edge of said end for the passage of seed from said end into the upper section, said baffle having an upper conical end for deflecting seed ejected from said distributor downwardly and outwardly, a gravity feed device for depositing seed in said distributor, means for rotating the distributor comprising a rotatably mounted shaft extending upwardly through said cylindrical structure and deflector assembly axially thereof, a blower fan rotatably mounted in the lower end of said air tunnel, said lower member of the deflector assembly being slidable on said shaft, and means for selectively positioning said lower member along said shaft toward and away from said blower fan.

References Cited in the file of this patent

UNITED STATES PATENTS

| | | |
|---|---|---|
| 2,099,505 | Weaver | Nov. 16, 1937 |
| 2,638,217 | Niemitz | May 12, 1953 |